(12) United States Patent
Visagie

(10) Patent No.: US 6,435,965 B2
(45) Date of Patent: Aug. 20, 2002

(54) BAFFLE SYSTEM IN A ROTARY THRESHING AND SEPARATION UNIT

(75) Inventor: Andrie Diederich Visagie, Bothaville (ZA)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 09/758,796

(22) Filed: Jan. 11, 2001

Related U.S. Application Data

(63) Continuation-in-part of application No. 09/125,348, filed on Aug. 18, 1998, now Pat. No. 6,176,778.

(30) Foreign Application Priority Data

Jul. 31, 2000 (WO) .............................. PCT/EP00/07371

(51) Int. Cl.[7] .......................... A01F 11/06; A23N 5/00; B02B 3/00
(52) U.S. Cl. ............................. 460/45; 460/46; 460/99; 460/143; 460/4
(58) Field of Search .......................... 460/45, 5, 4, 85, 460/98, 100, 46, 101, 143, 12, 13, 93, 902, 99; 56/10.2 C, 14.6; 209/318

(56) References Cited

U.S. PATENT DOCUMENTS

| | | | |
|---|---|---|---|
| 875,550 A | * 12/1907 | McCorkell | .................... 460/85 |
| 1,850,279 A | 3/1932 | Dieterich | |
| 2,210,821 A | 8/1940 | Sharp | |
| 2,222,282 A | 11/1940 | Court | |
| 2,271,897 A | 2/1942 | Mast | |
| 2,344,235 A | 3/1944 | Crumb et al. | |
| 2,484,999 A | 10/1949 | Hyman | |
| 2,849,118 A | * 8/1958 | Ashton | ........................ 209/318 |
| 3,348,780 A | 10/1967 | Barkstrom et al. | |
| 3,401,727 A | 9/1968 | Blanshine et al. | |
| 3,401,729 A | 9/1968 | Wallin et al. | |
| 3,536,077 A | 10/1970 | Stott et al. | |
| 3,603,063 A | * 9/1971 | Stroburg et al. | ............. 56/14.6 |
| 3,813,184 A | * 5/1974 | Temple et al. | ............. 415/53.3 |
| 3,844,293 A | 10/1974 | Young | |
| 4,036,065 A | * 7/1977 | Strelioff et al. | ............. 73/865.9 |
| 4,250,897 A | * 2/1981 | Glaser | ......................... 460/69 |
| 4,353,376 A | * 10/1982 | Schuler | ....................... 460/67 |
| 4,589,425 A | * 5/1986 | Mitchell, Jr. | .................. 460/99 |
| 4,906,219 A | * 3/1990 | Matousek et al. | ............ 460/98 |
| 5,017,177 A | 5/1991 | Mitkov et al. | |
| 5,176,574 A | * 1/1993 | Matousek et al. | .......... 460/100 |

FOREIGN PATENT DOCUMENTS

WO    WO 97/29628    8/1997

* cited by examiner

*Primary Examiner*—Robert E. Pezzuto
*Assistant Examiner*—Árpád Fábián Kovács
(74) *Attorney, Agent, or Firm*—Husch & Eppenberger, LLC; Robert E. Muir; Richard J. Musgrave

(57) ABSTRACT

A rotary threshing and separation unit, comprising a rotor housing with a feeding zone, separation zone and is discharge zone, parts of the circumferential housing being closed and other parts having openings, rotary driven threshing and separation rotor arranged in the rotor housing, beater plates fixed on the threshing and separation rotor, fan to produce a main air flow stream and auxiliary air flow stream through the rotor housing, and wherein baffle plates are adjustable and located between the sieve and grain collection element wherein the baffle plates effect the auxiliary air flow stream. The baffle plates are adjustable in position, length and width parallel and traverse to the rotary threshing and separation unit axis.

20 Claims, 4 Drawing Sheets

BAFFLE SYSTEM IN A ROTARY THRESHING AND SEPARATION UNIT

APPLICATION CROSS-REFERENCES

This application is a continuation-in-part of co-pending U.S. application Ser. No. 09/125,348, filed Aug. 18, 1998 and now U.S. Pat. No. 6,176,778. This application also claims priority of PCT Application No. PCT/EP00/07371, filed Jul. 31, 2000, and which named the United States as a designated country.

FIELD OF THE INVENTION

This invention relates to the threshing, separating and cleaning of harvested grain. It relates more specifically to a harvesting apparatus.

It is envisaged that the invention will find application in the field of threshing of grain like maize (corn), wheat, beans, and the like, more particularly in the field of harvesting grain having lightweight or small, or both lightweight and small grain kernels such as wheat.

For purposes of this specification, the term "threshing" (and derivatives thereof) should be interpreted as including threshing, separating and cleaning (and corresponding derivatives thereof).

BACKGROUND OF THE INVENTION

Combine harvesters use rotary threshing units to harvest grain like maize, wheat, beans and the like (hereinafter "grain"). To thresh grain, it is required to separate the grain from the ears, pods and the like. After separating the grain from the ears, pods and the like, grain must be separated from the chaff, broken straw, debris and the like (hereinafter "chaff"). A fan or blower is used for this purpose whereby the fan produces an air flow stream that carries off or separates chaff from the grain. The chaff is carried off or separated from the grain because the chaff is lighter in weight than the grain. It is apparent that the air flow stream is crucial in the process of separating the grain from the chaff. The problem being that the air flow stream is dependent upon the physical characteristics of the rotary threshing and separation units. Under certain conditions, the air flow stream may not be effective in separating the grain. Further, in certain situations, the grain may be damaged due to the speed at which the grain is carried within the rotary threshing and separation units.

The present invention is directed to overcoming one or more of the problems set forth above.

SUMMARY OF THE INVENTION

An aspect of the invention is to improve the separating function of a threshing and separating unit with baffle plates.

Another aspect of the invention is to improve the separating function of a threshing and separating unit with adjustable baffle plates.

Another aspect of the invention is to improve the separating function of a threshing and separating unit with adjustable baffle plates wherein the cross-sectional shape of at least one baffle plate is variable.

Another aspect of the invention is to improve the separating function of a threshing and separating unit with adjustable baffle plates, wherein the height of at least one baffle plate is variably adjustable and by varying the height of the baffle plate, the travel path of the auxiliary air flow stream is varied to facilitate the separation and cleaning of harvested grain kernels.

Another aspect of the invention there are provided adjustable baffle plates to adjust the length and/or height position and/or the cross-sectional length of at least one baffle plate to an optimal setting.

In yet another aspect of the invention there are provided adjustable baffle plates, wherein an electronic control device adjusts the settings of at least one baffle plate.

In yet another aspect of the invention there are provided adjustable baffle plates, and wherein the baffle plates are automatically adjusted dependent upon the readings from a grain loss sensor, which measures the number of grain kernels that hit the grain loss sensor.

In still yet another aspect of the invention there is provided a remote-controlled adjustment of the settings of at least one baffle plate effected by actuators controlled by the electronic control device, and wherein the electronic control device operates the actuators according to electronically transmitted input data generated by an operator to adjust the travelling path of the auxiliary air flow stream.

In still yet another aspect of the invention there is provided a remote-controlled adjustment of the settings of at least one baffle plate effected by actuators controlled by the electronic control device which are controlled by remote control actuators.

The above aspects are merely illustrative and should not be construed as all-inclusive.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
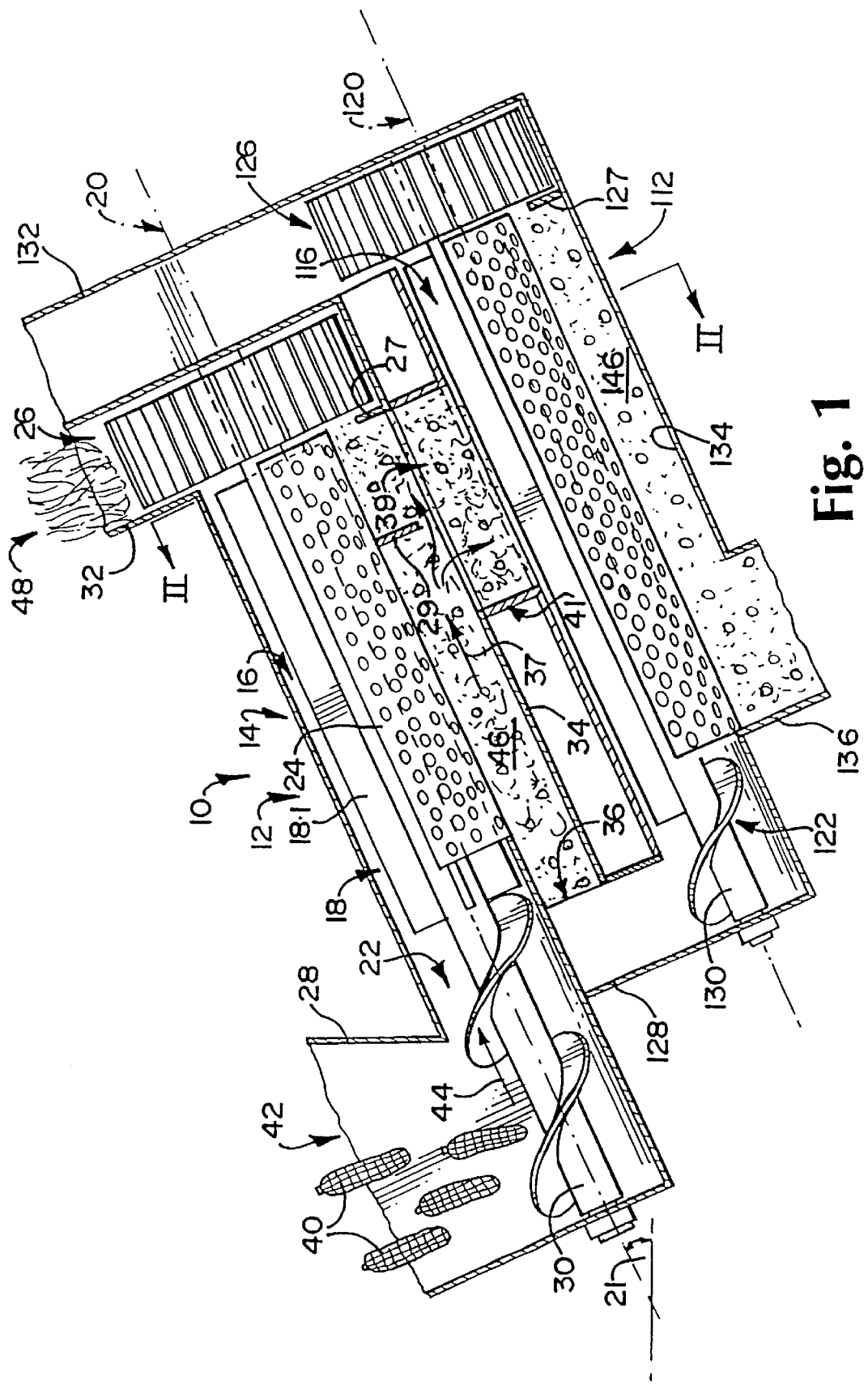
FIG. 1 is an axial sectional view illustrating the rotary threshing and separation unit.

With reference to FIG. 1, a rotary threshing and separation unit is generally indicated by reference numeral 10. The threshing apparatus 10 is a composite threshing apparatus having a first apparatus in the form of threshing apparatus generally indicated by reference numeral 12 and a second apparatus in the form of a cleaning apparatus generally indicated by reference numeral 112. The first 12 and second apparatus 112 are arranged to perform successive steps in the method of the invention i.e. they operate in series. The second apparatus 112 is arranged generally below the first apparatus 12.

The first threshing apparatus 12 comprises a generally round cylindrical casing generally indicated by reference numeral 14 and defining a threshing zone generally indicated by reference numeral 16 about a threshing axis 20. The threshing axis 20 is arranged, in this embodiment, at an angle 21 which is preferably between about 30° to about 45° from the horizontal, however, this is not an absolute necessity.

The first threshing apparatus 12 includes a threshing means 18 operatively provided within the threshing zone 16.

Transport means 22, which is in the form of a screw conveyor or auger is arranged to transport harvested crop in the forms of ears, pods, or the like from a hopper 28 obliquely upwardly into the threshing zone 16. The screw conveyor 22 is conveniently co-axial with the axis 20.

A longitudinal boundary along a lower portion of the threshing zone 16 is defined by means of an arcuate, trough-like sieve 24 having perforations. The sieve 24 is arranged concentrically with the axis 20.

At one end, which is an upper end in use, of the threshing zone 16, there is provided a fan 26, co-axially with the threshing axis 20, to generate an air flow stream from the hopper 28, through the threshing zone, and to exhaust the air flow stream via outlet conduit 32. The fan 26 is of the centrifugal type and an inlet of the fan 26 is co-axially aligned with the threshing axis 20.

A common shaft or axle 30 acts as a tubular shaft over which flighting of the auger 22 is provided, and in series with the flighting, beater bars 18.1 of the threshing means are mounted on the shaft 30 to extend radially and longitudinally. Also the fan 26 is mounted on the shaft 30. In another embodiment, the fan 26 may be driven from the shaft 30 via a speed changing device.

Underneath the sieve 24, and generally parallel with the axis 20, there is 30 provided a trough 34 which is, at its lower end, open as indicated at 36. The open end 36, in relation to the second apparatus 112, corresponds to or is analogous to the hopper 28 in relation to the first apparatus 12, and leads into transport means of the second cleaning apparatus 112.

Figure 2:
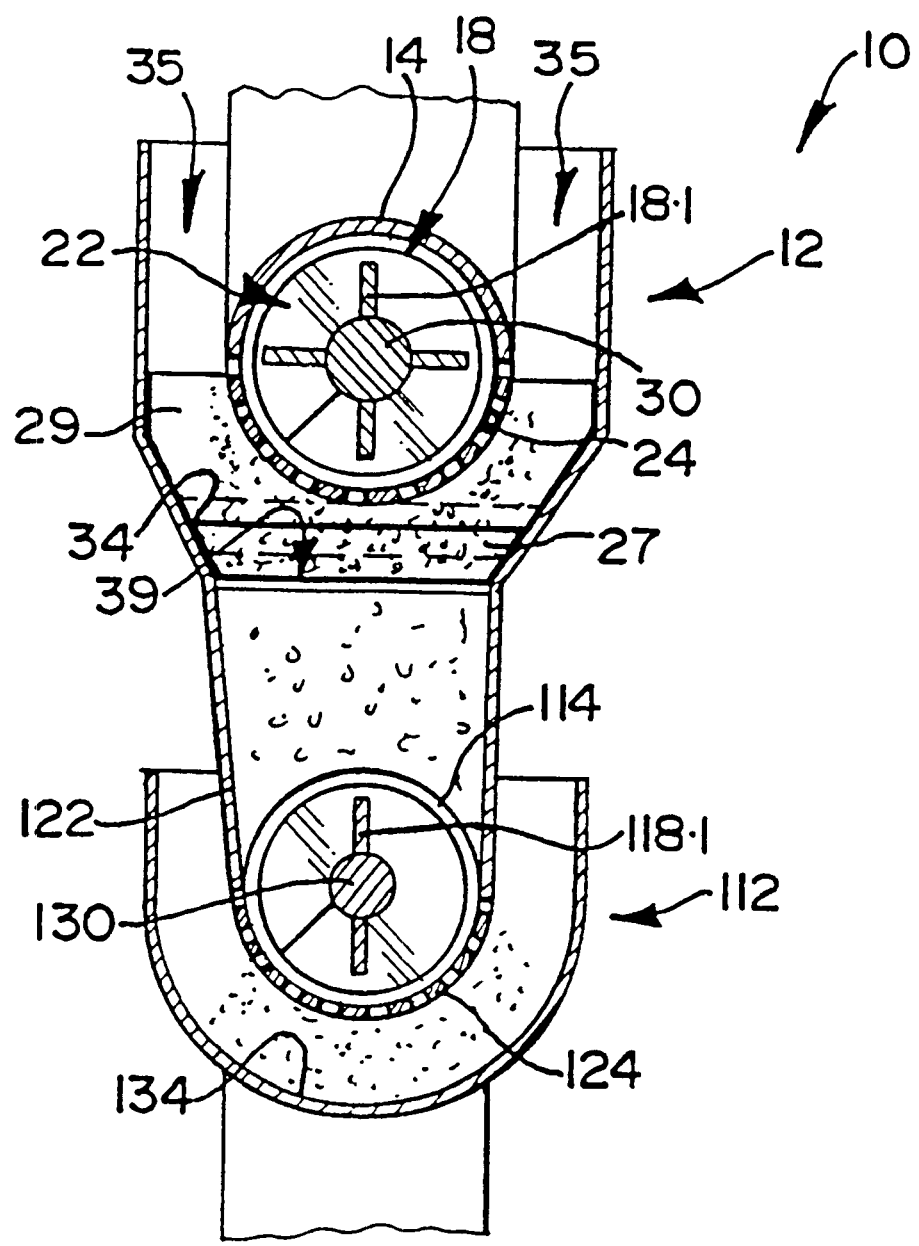
FIG. 2 is a sectional view taken at II—II in FIG. 1.

Air inlet openings 35, which are out of the plane of the section of FIG. 1 and which can be perceived from FIG. 2, allows air to be drawn via the trough 34 as shown at 37 into the fan 26. The inlet opening of the fan 26 is sufficiently large to have an influence outside the threshing zone 16. Air also flows via the opening between the trough 34 and the sieve 24 and via the openings in the sieve 24 to the central regions of the fan inlet. Such air flow lifts chaff off the sieve 24 and carries the chaff to the fan 26.

A volute for the fan 26 is formed partially by a transverse baffle 27 at an upper end of the trough 34. The baffle 27 is mounted on the trough and extends upwardly from the trough. The baffle 27 is easily replaceable, e.g. to adjust its height. The baffle 27 provides a barrier to prevent grain, which because of its relatively high density, is concentrated along the floor of the trough, from being drawn into the fan 26 and exhausted via conduit 32.

By way of development, a transverse intermediate baffle 29 is provided between the open end 36 and the baffle 27. The baffle 29 depends from the sieve 24. It can readily be replaced to vary, for example, its height. The free ends of the baffles 27 and 29 preferably overlap when seen in axial projection. The upstream baffle 27 will deflect grain, which has become airborne to prevent such airborne grain from being drawn into the fan 26. Furthermore, the baffles 27, 29 cause the auxiliary air flow stream to become circuitous to be directed momentarily generally into an auxiliary grain exit 39 which will be described hereinafter. The baffle 29 is advantageously opposite to a center of the auxiliary grain exit 39.

It is to be appreciated that, because the sieve 24 and the trough 34 are merely arcuate or convex and not circular, the air flow stream 37 moves in a relatively narrow channel, thus making it more effective, alternatively requiring less air to be moved.

In use, harvested crops in the form of ears, pods, or the like fall under gravity into the hopper 28 to be transported obliquely upwardly as indicated at 44 into the threshing zone 16 by the transport means 22. In the threshing zone 16, the ears, pods or the like are threshed to liberate grain from chaff. The chaff in the threshing zone 16 is carried by the flow stream through the fan 26 to be exhausted via the conduit 32 as indicated at 48. The grain falls under gravity and under centrifugal force through the air flow stream onto the sieve 24. The apertures of the sieve are selected to pass liberated grain with clearance. Thus, liberated grain, with an amount of relatively small pieces of chaff, fall into the trough 34 as indicated by reference numeral 46. The small pieces of chaff are carried by the flow stream 37 along the trough 34.

In accordance with this embodiment, there is an aperture provided forming an auxiliary grain exit 39 (mentioned above) in the bottom of the trough 34 between the fan 26 and the open end 36. The baffle 27 may be at or proximate downstream extremity of the auxiliary grain exit 39. The auxiliary grain exit 39 leads via an internal chamber 41 to the second apparatus 112.

Thus, grain which may be carried in the air flow stream 37, because of the relatively heavy weight compared to the weight of the small pieces of chaff, will tend to be at a low level, i.e., concentrated near the bottom of the trough 34. A portion of the air flow stream carrying such concentrated grain flows via the auxiliary grain exit 39 and the chamber 41 (which will be relatively stagnant in respect of airflow) into the apparatus 112. The baffle 27 precludes grain from being carried by the air flow stream through the fan 26 to be exhausted via the conduit 32 while allowing the small pieces of chaff to exit via the fan 26 and the conduit 32.

The length of the grain exit may be between 25% and 75%, typically about 50% of the length of the trough 34, which is approximate in length to the sieve 24. The projected width of the grain exit may be about equal to the to the projected width of the sieve. The height of the chamber 41 may be about equal to the spacing between the sieve and the trough.

As mentioned above, interaction of the baffles 27, 29 and the auxiliary air flow stream causes the flow stream to become circuitous around the end of the baffle 29. Grain, carried in the auxiliary air flow stream and which will tend to progress tangentially on account of inertia as a result of relatively high density, will be directed generally into the auxiliary grain exit 39. In contrast, chaff, being of relatively low density, will tend to follow the auxiliary air flow stream to be exhausted.

The major portion of the liberated grain 46 slides along the trough 34 via the open end 36, which forms a main grain exit in the context of this embodiment, onto the transport means 122 of the second, cleaning apparatus 112.

The Applicant is of opinion that approximately 25% of the liberated grain exit the first apparatus 12 via the auxiliary grain exit 39, and the balance of about 75% via the main grain exit 36. This ratio is influenced by and can be adjusted by adjusting the velocity or speed of the airflow stream.

Furthermore, the heights of the baffles 27, 29 and thus their overlap, can be adjusted by replacing one or both of them with baffles having different lengths.

The second, cleaning apparatus 112 is similar to the first, threshing apparatus 12 and is not again described. Like reference numerals refer to like components or features. Reference numeral 118.1 indicates stirring bars or agitating bars in place of the beater bars 18.1.

Grain exiting the apertures via the main grain exit 36, is transported into the cleaning zone 116 by transport means 122. The grain exiting via the auxiliary grain exit 39 falls directly into the cleaning zone 116.

Cleaned grain 146 is discharged from the threshing apparatus 10 via an outlet 136 where it is collected. Chaff is exhausted via the conduit 32 and 132.

If desired, a re-circulating grain exit may be provided in the trough 134 analogous to and in a position corresponding to the auxiliary grain exit. Products exiting such re-circulating grain exit can then be re-circulated or returned, either via the hopper 28, or via the transport means 122.

It is believed that in many applications, threshing by means of the first threshing apparatus 12 will provide adequately cleaned grain and that a second step, which will merely be a cleaning step, will not be required. Thus, in those applications, grain will be collected from the open end 36, and the products from the auxiliary grain exit 39 will be returned to or re-circulated to the hopper 28.

It is a first advantage that grain and chaff are separated already in the threshing zone 16. This is conducive to simplicity of design and effectiveness in operation. Transport of the liberated grain and chaff is facilitated and the threshing apparatus can be provided less expensively than comparable threshing apparatus of which the Applicant is aware.

It is further an advantage that the sieve 24 is stationary as it is operated by means of gravity and centrifugal forces, operating on the liberated grain.

It is a further advantage that the sieve 24 through which the liberated grain is passed is merely arcuate and not fully cylindrical. Provision of an arcuate or, in this case, semi-cylindrical sieve is adequate and allows a saving in cost.

The provision of the auxiliary grain exit 39 allows the intensity of the air flow stream to be greatly increased without aggravating loss of grain through the conduit 32. This enhances the cleaning action. This is especially advantageous with small or light grain such as wheat. It is believed that the provision of such an auxiliary grain exit 39, especially in association with the baffle downstream thereof and also the opposing baffle, allows the capacity of the apparatus to be increased substantially. With light and/or small grain kernels, the capacity can be increased by 100% or more in some applications. It is believed that such an improvement can be achieved because of the enhanced cleaning action because of the increased air flow stream intensity.

Figure 3:
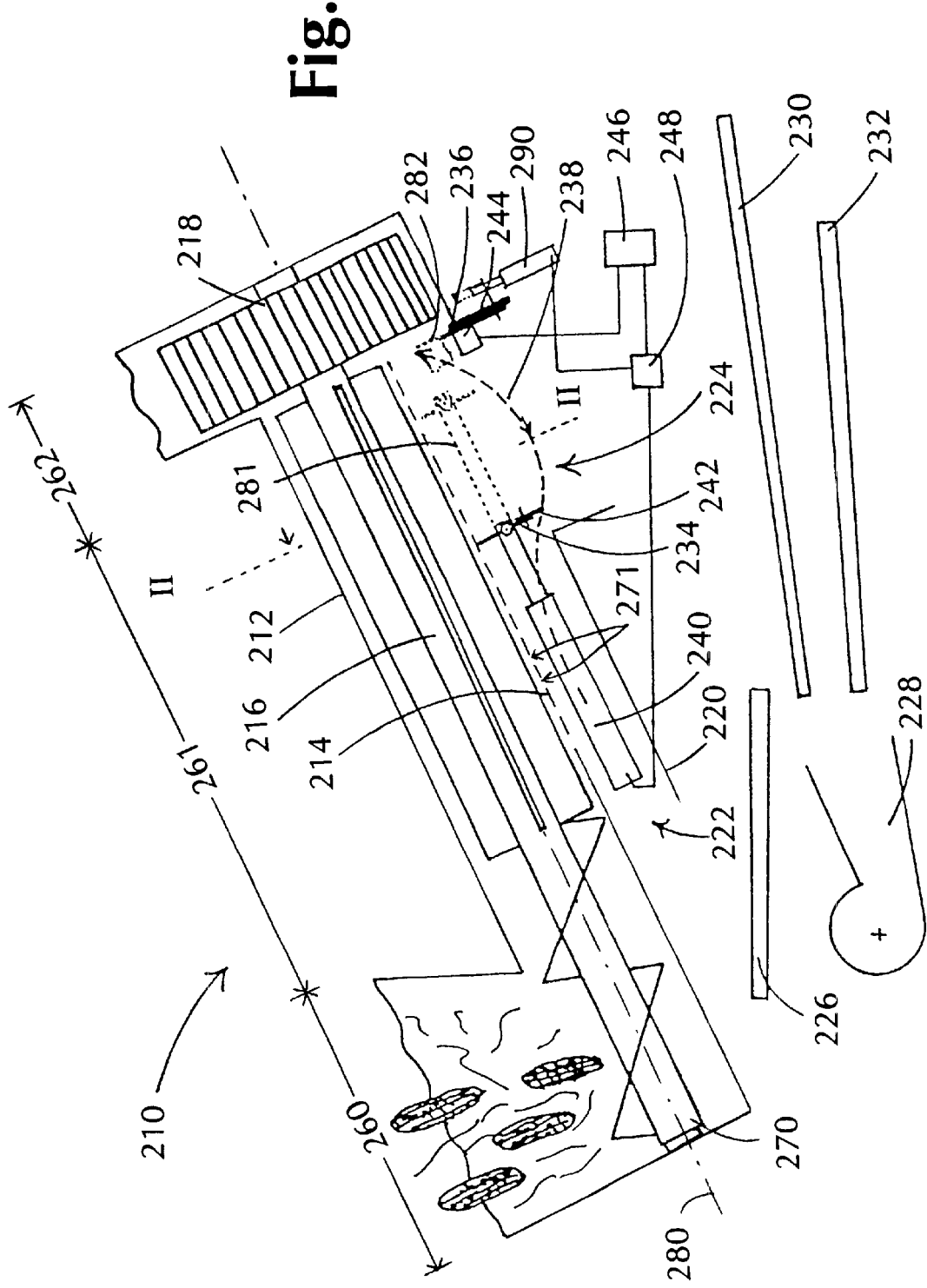
FIG. 3 is a side elevation of the threshing and separation unit.

In FIG. 3, a rotor threshing and separation unit 210 does not only thresh and separate, it also cleans the harvested grain. The feeding action inside of the rotor housing 212 is generated by, inter alia, the main air flow stream above a sieve 214 which moves or carries the harvested grain through the rotor housing 212. Grain exiting the rotor housing 212 through openings 271 in the sieve 214 are subjected to an auxiliary air flow stream between the sieve 214 and grain collecting element 220. The auxiliary air flow stream serves to separate the grain kernels from chaff. Furthermore, portions of the auxiliary air flow stream passes through openings 271 in the sieve 214. To improve the separating function in the space between the sieve 214 and grain collecting element 220, a second grain exit 224 is used. To improve the separation of grain, baffle plates 234, 236 are utilized to urge the auxiliary air flow stream into a circuitous route. It is imperative to determine the appropriate locations or positions of the baffle plates 234, 236. The location and position are changed dependent on the working conditions and type of crops being harvested. Using the same locations or positions under different conditions and crops is not desirable. Having adjustable and movable baffle plates 234, 236 are desirable and explained herein.

Combine harvesters use rotary threshing and separation units 210 to thresh and separate grain kernel from the ear, pod or the like. FIG. 3 illustrates the rotary threshing and separation unit 210. It includes a rotor housing 212 wherein parts of the circumferential rotor housing 212 are closed and other parts are opened. Further, the rotary threshing and separation unit 210 has a feeding zone 260 for receiving harvested crops, separation zone 261 connected to the feeding zone 261 and discharge zone 262 connected to the feeding zone 261, sieve 214 arranged at least in the separation zone 261, a rotary driven separation rotor 216 arranged in the rotor housing 212, beater plates (not shown) fixed on the rotary driven separation rotor 216, baffle plates 334, 336 arranged below the sieve 214, and fan or blower 218 for creating a main air flow stream from the feeding zone 260 to the discharge zone 262 and an auxiliary air flow stream between the sieve 214 and a grain collecting element 220, and wherein the grain collecting element 220 is arranged approximately parallel but below the sieve 214.

The physical characteristics of the feeding zone 260, separation zone 261 and discharge zone 262 can be modified and adapted pursuant to the working conditions, crop harvested or the like. Further, the tools attached to the separation rotor 216 in the feeding zone 260, separation zone 261 and discharge zone 262 can be selected according to the working conditions, crop harvested or the like. The feeding elements are not shown; however, for example, when using a combine harvester, a feed rake (not shown) may be arranged in the feeder housing for receiving the harvested crop from the cutterbar and distributing same towards the threshing elements.

Harvested crop is fed into the feeding zone 260. The harvested crop is transportable via transport mechanism 270 to the separation zone 261 where it is threshed and/or separated. The grain kernels get separated from the ear, pod or like because of the threshing of the harvested crop. The grain kernels are accelerated into an axial movement along the inner surface of the rotor housing 212 because of the centrifugal forces acting upon the grain kernels and the air flow streams created by the fan 218. As the grain kernels travel along the rotor housing 212, a substantial portion of the grain kernels fall through the openings 271 in the sieve 214 into the space between the sieve 214 and the grain collecting element 220. A portion of the separated grain kernels that fall on the grain collecting element 220 travel towards a first grain exit 222, and the remaining separated grain kernels that fell through the opening 271 travel to a second grain exit 224. The grain kernels passing through the grain exits 222, 224 are subjected to a further cleaning process. The grain kernels falling from the first grain exit 222 fall into a grain pan 226, where as the grain kernels falling from the second grain exit 224 fall into an upper sieve 230 or lower sieve 232. A blower unit 228 is used to further clean or separate chaff and particles from the grain kernels. The grain kernels are then collected, for example, in a grain bin (not shown).

The auxiliary air flow stream from the fan 218 flows through the space between the sieve 214 and the grain collecting element 220 towards the fan 218. This auxiliary air flow stream is used to remove chaff from the grain kernels. The auxiliary air flow stream is deviated by the baffle plates 234, 236. The baffle plate 234 forces the air flow stream downwards (as shown), and baffle plate 236 forces the air flow stream upwards (as shown). The path of the auxiliary air flow stream looks substantially like path 238, shown as broken lines. This air flow stream carries away the lighter fractions, such as chaff, broken straw, debris and the like, following substantially the path 238 of the air flow stream because of its lighter weight. Conversely, grain kernels being greater in weight with respect to chaff incorporate a higher degree of moving energy and are not deviated by the air flow stream. The grain kernels maintain its initial flow path but with a higher level of moving energy. As such, the air flow stream deviates around baffle plate 234 but the grain kernels do not necessarily follow the deviation. The grain kernels will either travel to the second grain exit 224 or fall back to the first grain exit 222. There may be a significant difference between the moving energy levels of grain kernels. A factor in the speed and energy levels of the grain kernels is the size of the grain kernels. For example, the aerodynamics of rice is different to those of beans, and maize kernels is different than rapeseed kernels because of the size differential. Further, the humidity inside of the grain kernel, rotational speed of the rotor and the amount of straw and leaves will be factors in the speed and travel path of grain kernels. In short, there are many influencing factors that affect the moving energy, speed and travel path of the grain kernels.

The chaff between the sieve 214 and grain collecting element 220 will follow air path 238, enter the discharge zone 262 and be discharged out of the unit 210 by the forces created by the fan 218. The grain kernels between the sieve 214 and grain collecting element 220 will travel along the grain collecting element 220. If they hit the baffle plate 34 at high speeds, the grain kernels might crack. It is not desirable to have the grain kernels collide with the baffle plate 234. On the other hand, if the grain kernels move too slowly the baffle plate 234 may hinder the sucking action of the auxiliary air flow stream generated by the fan 218. It is desirable to have the grain kernels exit though the first grain exit 222 or the second grain exit 224 without deflection with the baffle plate 234 at high speeds. It is the adjustment of baffle plates 234, 236 that will influence the travel path of the grain kernels.

In order to adjust the position of the baffle plate 234 to the requirements of the working conditions, an actuator 240 is used. In FIG. 3 the actuator 240 is shown as a hydraulic cylinder; however, it is obvious to those skilled in the art that other driving element, or manual manipulation may be used. The actuator 240 has a piston which is moved parallel to axis 280. The baffle plate 234 is mounted traverse to the axis 280 and the auxiliary air flow stream. The baffle plate 234 is moved via the actuator 240 along the area between the sieve 214 and the grain collection element 220. The baffle plate 234 moves back and forth along a baffle path 281 shown as dotted lines.

With respect to second actuator 290, the operation is the same but offset by 90 degrees from the first actuator 260. A second actuator 290 is mounted traverse to the axis 280. In FIG. 3 the second actuator 290 is shown as a hydraulic cylinder; however, it is obvious to those skilled in the art that other driving element, or manual manipulation may be used. The second actuator 290 has a piston, which is moved traverse to axis 280. The baffle plate 236 is mounted transverse to axis 280 and the auxiliary air flow stream. The baffle plate 236 is moved via the actuator 290 along the area between the sieve 214 and the grain collection element 220. The baffle plate 236 moves back and forth along a baffle path 282 shown as dotted lines. By shifting the positions of baffle plates 234, 236, it is possible to influence the air flow stream path and the volume of the air flow stream sucked through the rotor housing 212. It follows that the by altering the position of baffles 234, 236, the amount of grain kernels exiting the first grain exit 222 and second grain exit 224 will be controlled.

Figure 4:
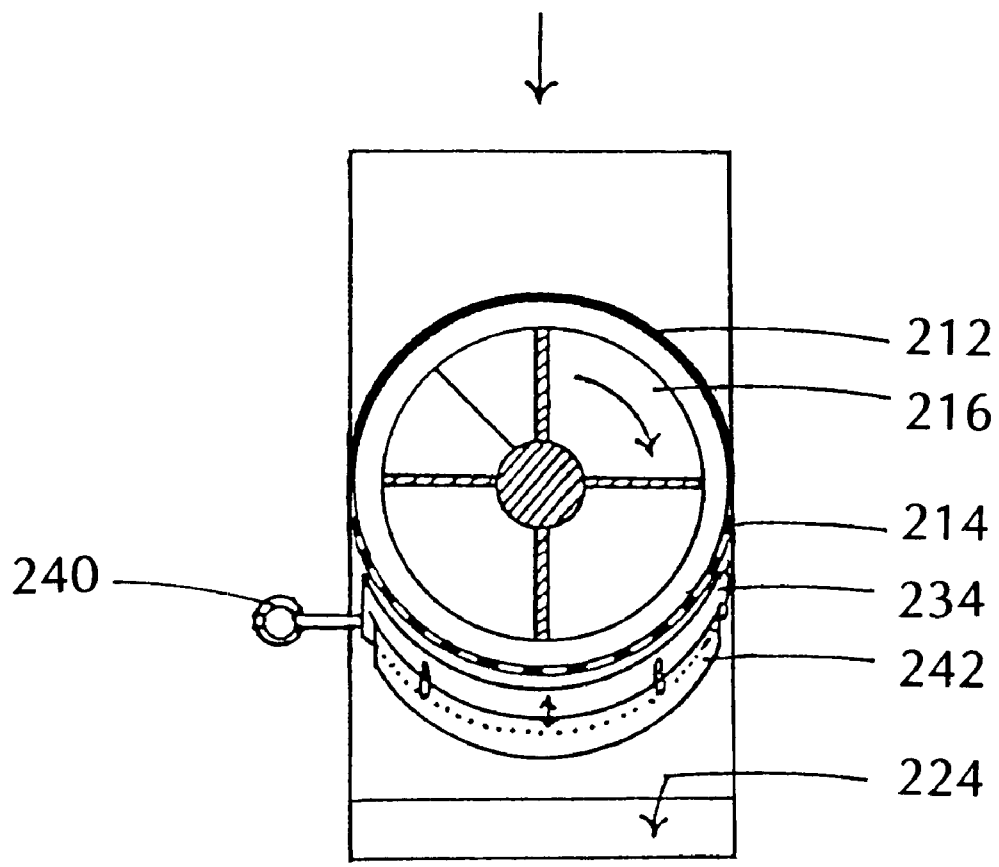
FIG. 4 shows a cross-sectional view along line II—II in FIG. 3.

To vary the influence of baffle plates 234, 236, the shape of the baffle plates 234, 236 can be varied. FIG. 4, illustrates a cross sectional view along line II—II in FIG. 3 in the direction of the feeding zone 260. Extension 242 is fixed by screws and guided by slotted holes. The extension 242 extends and retracts depending on the desired length of the extension 242. The baffle plates 234, 234 are increased and decreased in height by extending or retracting the extension 242.

To automate the adjustment of the extension 242, actuator 240 with baffle plate 234 and actuator 290 with baffle plate 236, a grain loss sensor 244 is fixed on baffle plate 236. The grain loss sensor 244 is able to detect the number of grain kernels that hit the baffle 236. This number of hits is a measure of how effective baffle plates 234, 236 are set. Starting with a certain setting, the present hit level can be transmitted towards an electronic control device 246, such as a computer (not shown). The computer will be programmed with algorithms and stored data to ascertain whether the baffle plates 234, 236 are at the desired settings. If not, a new setting value is determined by an operator who causes adjustments by inputting same. The electronic control device 246 will then emit a setting signal to a valve 248, which controls the settings of actuators 240, 290. If setting changes are performed, a new hit level will be detected by the grain loss sensor 244 and transferred to the computer to determine if the desired setting have been achieved. For simple systems, it is possible to pre-select a setting for the baffle plates 234, 236 for certain crops, and the setting will be performed by the electronic control device 246. Alternatively, just one of the baffle plate 234 or 236 could be operated by the electronic control device 246. The extension 242 can also be integrated into a system operated by the electronic control device 246.

While the preferred structure in which the principles of the present invention have been incorporated is shown and described above, it is to be understood that the invention is not to be limited to the particular details thus presented, but in fact, widely different means may be employed in the practice of the broader aspects of this invention. The scope of the appended claims is intended to encompass all obvious changes in the details, materials and arrangements of parts, which will occur to one skilled in the art upon a reading of the disclosure.

What is claimed is:

1. A rotary threshing and separation unit for harvesting crop and having a circumferential, rotor housing with apertures therein, comprising:
    means for receiving the harvested crop and defining a feeding zone;
    a rotary driven threshing and separation rotor arranged in the rotor housing and therewith defining a separation zone;
    a transport mechanism that transports the harvested crop from the feeding zone to the separation zone;
    a plurality of beater plates fixed to the threshing and separation rotor to thresh the harvested crop;
    a sieve and grain collection elements contained within the rotor housing;
    means operatively connected to the separation zone for exhausting chaff from grain kernels associated with the harvested crop and defining a discharge zone;
    a fan for generating a main air flow stream from the feeding zone to the discharge zone for separating the chaff from the grain kernels and discharging the chaff from the threshing and separation unit and an auxiliary air flow stream between the sieve and grain collecting element; and at least one baffle plate removably and adjustably mounted in a first position and movable to at least a second position to vary the auxiliary air flow stream and arranged to facilitate the discharge of chaff from the threshing and separation unit and to facilitate movement of the grain kernels within the threshing and separation unit.

2. A rotary threshing and separation unit according to claim 1, wherein the at least one baffle plate is adjustable in length in a direction transverse to the auxiliary air flow stream.

3. A rotary threshing and separation unit according to claim 1, wherein at least one baffle plate is releasably fixed to the threshing and separation unit with an adjustable position, a cross-sectional shape of the at least one baffle plate is variable and a height of the at least one baffle plate is variable.

4. A rotary threshing and separation unit according to claim 3, further including:
an electronic control device, wherein the electronic control device provides adjustments in location and length of the at least one baffle plate.

5. A rotary threshing and separation unit according to claim 4, further including:
a grain loss sensor fixed to the at least one baffle plate, wherein the grain loss sensor senses a number of the grain kernels contacting it and communicates the number to the electronic control device.

6. A rotary threshing and separation unit according to claim 5, further including:
a remote-controlled adjustment mechanism, wherein the remote-controlled adjustment mechanism communicates with the electronic control device thereby manipulating at least one actuator to adjust and move the location and length of the baffle plates.

7. A rotary threshing and separation unit according to claim 1, wherein the movement of the at least one baffle plate from the first position to at least a second position is in a direction lengthwise of the auxiliary air flow stream.

8. A rotary threshing and separation unit for harvesting crop and having a circumferential, rotor housing with apertures therein, comprising:
means for receiving the harvested crop and defining a feeding zone;
a rotary driven threshing and separation rotor arranged in the rotor housing and therewith defining a separation zone;
a transport mechanism that transports the harvested crop from the feeding zone to the separation zone;
a plurality of beater plates fixed to the threshing and separation rotor to thresh the harvested crop;
a sieve and grain collection elements within the rotor housing;
means operatively connected to the separation zone for exhausting chaff from grain kernels associated with the harvested crop and defining a discharge zone;
a fan for generating an air flow stream including a main air flow stream from the feeding zone to the discharge zone for separating the chaff from the grain kernels and discharging the chaff from the threshing and separation unit and an auxiliary air flow stream between the sieve and grain collecting element; and
at least one baffle plate adjustably mounted transverse to the auxiliary air flow stream and movable from a first position to at least a second position to vary the auxiliary air flow stream thereby facilitating discharge of chaff from the threshing and separation unit and facilitating movement of the grain kernels within the threshing and separation unit.

9. A rotary threshing and separation unit according to claim 8, wherein the at least one baffle plate is adjustable in length in a direction transverse to the auxiliary air flow stream.

10. A rotary threshing and separation unit according to claim 9, further including:
an electronic control device and wherein the electronic control device provides adjustments to location and length to the at least one baffle plate.

11. A rotary threshing and separation unit according to claim 10, further including:
a grain loss sensor fixed to the at least one baffle plate, wherein the grain loss sensor senses a number of the grain kernels contacting it and communicates the number to the electronic control device.

12. A rotary threshing and separation unit according to claim 11, further including:
a remote-controlled adjustment mechanism, wherein the remote-controlled adjustment mechanism communicates with the electronic control device thereby manipulating at least one actuator to adjust and move the location and the length of the at least one baffle plate.

13. A rotary threshing and separation unit according to claim 8, wherein at least one baffle plate is releasably fixed to the threshing and separation unit with an adjustable position, a cross-sectional shape of the at least one baffle plate is variable and a height of the at least one baffle plate is variable.

14. A rotary threshing and separation unit according to claim 13, further including:
an electronic control device, wherein the electronic control device provides adjustments in location and length of the at least one baffle plate.

15. A rotary threshing and separation unit according to claim 15, further including:
a grain loss sensor fixed to the at least one baffle plate, wherein the grain loss sensor senses a number of the grain kernels contacting it and communicates the number to the electronic device.

16. A rotary threshing and separation unit according to claim 15, further including a remote-controlled adjustment mechanism, wherein the remote-controlled adjustment mechanism communicates with the electronic control device thereby manipulating at least one actuator to adjust and move the location and length of the baffle plates.

17. A rotary threshing and separation unit according to claim 8, wherein the movement of the at least one baffle plate from the first position to at least a second position is in a direction lengthwise of the auxiliary air flow stream.

18. A rotary threshing and separation unit for harvesting crop having a circumferential, rotor housing with apertures therein, comprising:
a feeding zone for receiving the harvested crop;
a transport mechanism that transports the harvested crop from the feeding zone;
a separation zone operatively connected to the feeding zone, wherein the harvested crop is transportable to the separation zone by the transport mechanism to be threshed;

a rotary driven threshing and separation rotor arranged in the rotor housing;

a plurality of beater plates fixed to the threshing and separation rotor to thresh the harvested crop;

a sieve and grain collection elements contained within the rotor housing;

a discharge zone operatively connected to the separation zone for exhausting chaff from grain kernels associated with the harvested crop;

a fan for generating a main air flow stream from at least the feeding zone to the discharge zone for separating the chaff from the grain kernels and discharging the chaff from the threshing and separation unit after threshing and an auxiliary air flow stream between at least the sieve and grain collecting element;

at least one baffle plate removably mounted in a first position and movable therefrom to vary the auxiliary air flow stream and arranged to facilitate the discharge of chaff from the threshing and separation unit and to facilitate movement of the grain kernels within the threshing and separation unit and;

an electronic control device for providing adjustments to location of the at least one baffle plate.

19. A rotary threshing and separation unit according to claim 18, further including:

a grain loss sensor fixed to the at least one baffle plate, wherein the grain loss sensor senses a number of the grain kernels contacting it and communicates the number to the electronic control device.

20. A rotary threshing and separation unit according to claim 19, further including:

a remote-controlled adjustment mechanism, wherein the remote-controlled adjustment mechanism communicates with the electronic control device thereby manipulating the actuators to adjust and move the location and the length of the at least one baffle plate.

* * * * *